United States Patent
Saitoh et al.

(10) Patent No.: US 11,601,021 B2
(45) Date of Patent: Mar. 7, 2023

(54) STATOR AND MOTOR

(71) Applicant: Panasonic Intellectual Property Management Co., Ltd., Osaka (JP)

(72) Inventors: Mitsuo Saitoh, Osaka (JP); Naoki Nojiri, Osaka (JP); Hideaki Hamada, Hyogo (JP); Kenji Tanimoto, Hyogo (JP); Fumihiko Kawai, Osaka (JP); Yukio Nishikawa, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 172 days.

(21) Appl. No.: 16/836,950

(22) Filed: Apr. 1, 2020

(65) Prior Publication Data

US 2020/0358323 A1     Nov. 12, 2020

(30) Foreign Application Priority Data

May 8, 2019 (JP) .............................. JP2019-088270

(51) Int. Cl.
   *H02K 1/02* (2006.01)
   *H02K 1/16* (2006.01)
   *H02K 29/03* (2006.01)

(52) U.S. Cl.
   CPC ................ *H02K 1/02* (2013.01); *H02K 1/16* (2013.01); *H02K 29/03* (2013.01)

(58) Field of Classification Search
   CPC ........... H02K 1/16; H02K 1/02; H02K 1/146; H02K 29/03; H02K 2201/03; H02K 2213/03

USPC .................................................... 310/216.006
   See application file for complete search history.

(56) References Cited

U.S. PATENT DOCUMENTS

| | | | |
|---|---|---|---|
| 5,334,894 A * | 8/1994 | Nakagawa | H02K 37/12 310/112 |
| 8,102,092 B2 * | 1/2012 | Tomohara | H02K 15/022 310/216.008 |
| 2009/0026872 A1 * | 1/2009 | Tomohara | H02K 1/148 310/216.011 |
| 2009/0108697 A1 | 4/2009 | Uetsuji et al. | |
| 2009/0133243 A1 * | 5/2009 | Akita | H02K 15/022 29/596 |
| 2011/0193440 A1 * | 8/2011 | Yamada | H02K 21/14 310/156.54 |

(Continued)

FOREIGN PATENT DOCUMENTS

| | | |
|---|---|---|
| JP | 3678102 B | 8/2005 |
| JP | 2009-112096 A | 5/2009 |

(Continued)

*Primary Examiner* — Alex W Mok
(74) *Attorney, Agent, or Firm* — McDermott Will & Emery LLP

(57) ABSTRACT

A motor includes a rotor and a stator. The stator is formed by laminating a plurality of magnetic thin strips each having a plurality of teeth parts. The magnetic thin strip includes an elliptical-shaped inner diameter part formed along tip end portions of the plural teeth parts. At least one magnetic thin strip in the laminated magnetic thin strips is shifted by a given angle with respect to other magnetic thin strips in a horizontal direction, and positions of all teeth parts of the laminated magnetic thin strips correspond to one another to reduce cogging torque.

10 Claims, 6 Drawing Sheets

(56) References Cited

U.S. PATENT DOCUMENTS

| | | | | |
|---|---|---|---|---|
| 2013/0076194 A1* | 3/2013 | Benner, Jr. | ............ | H02K 1/148 |
| | | | | 310/216.022 |
| 2013/0181549 A1* | 7/2013 | Benner, Jr. | ........... | H02K 21/046 |
| | | | | 310/38 |
| 2014/0009023 A1* | 1/2014 | Yamamura | ........... | H02K 1/2706 |
| | | | | 310/156.01 |
| 2014/0210285 A1* | 7/2014 | Fahimi | ................... | H02K 19/06 |
| | | | | 310/46 |
| 2018/0159389 A1* | 6/2018 | Nishikawa | ............. | H02K 1/146 |

FOREIGN PATENT DOCUMENTS

| | | | | |
|---|---|---|---|---|
| JP | 2013-219947 | | 10/2013 | |
| JP | 2018-093704 A | | 6/2018 | |
| WO | WO-2018216565 A1 * | | 11/2018 | ............. B21D 28/26 |

* cited by examiner

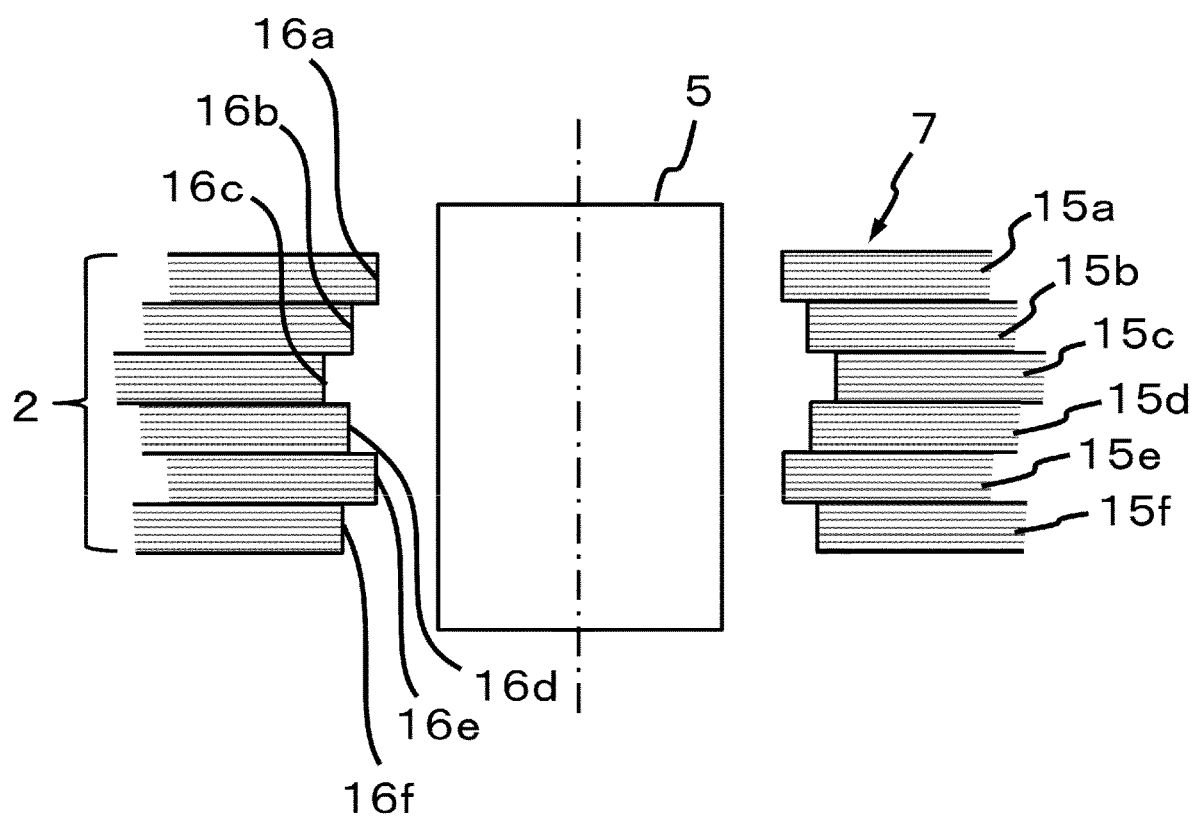

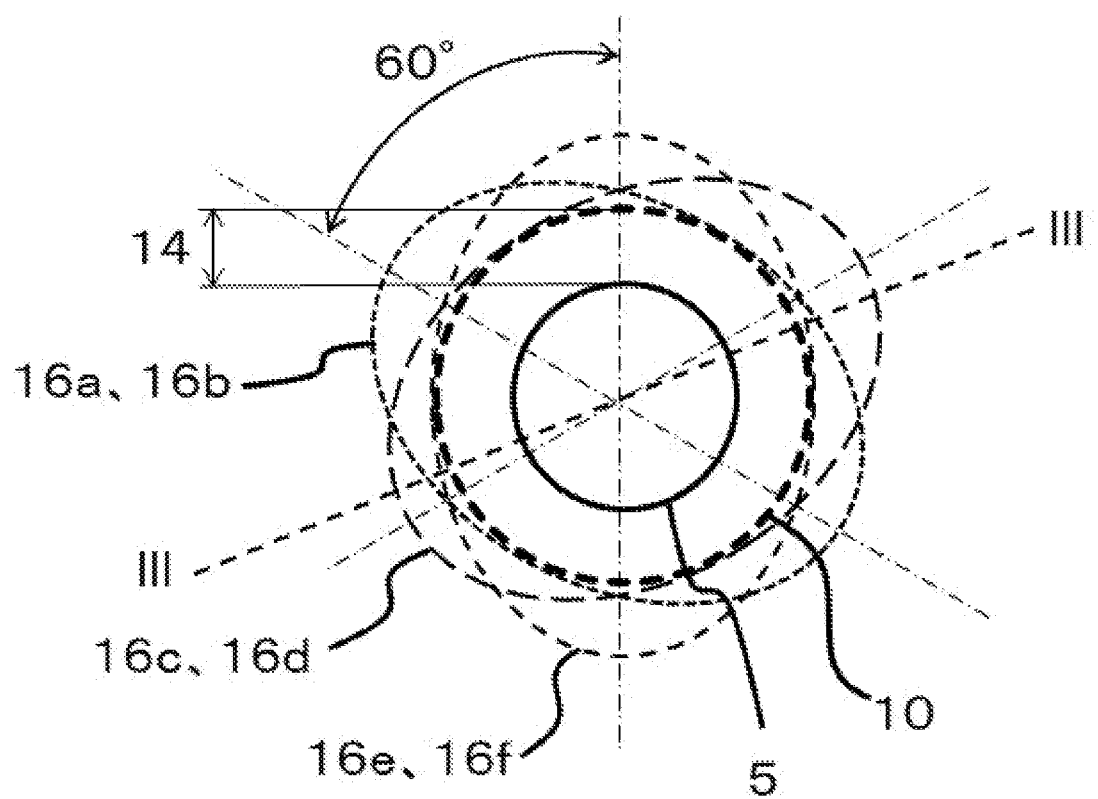

STATOR AND MOTOR

TECHNICAL FIELD

The technical field relates to a stator and a motor.

BACKGROUND

In a stator (also called a stator core) of a motor, pure iron, an electromagnetic steel sheet, an amorphous magnetic material, or a magnetic material with nanocrystal grains is used as a laminating member. As the amorphous magnetic material or the magnetic material with nanocrystal grains has a fraction of iron loss as compared with the electromagnetic steel sheet, such magnetic material is used for the purpose of increasing efficiency of the motor.

Here, a stator disclosed in Japanese Patent No. 3678102 (Patent Literature 1) will be explained with reference to FIG. 6. FIG. 6 is a top view of a stator 33 according to Patent Literature 1.

The stator 33 shown in FIG. 6 is formed by laminating a plurality of electromagnetic steel sheets 31 as a soft magnetic material. The electromagnetic steel sheets 31 are closely connected to one another by caulking. A plurality of teeth parts 32 are provided inside the stator 33 (electromagnetic steel sheets 31). Coils wound around the teeth parts 32 are not shown in FIG. 6.

Moreover, tip end parts of adjacent teeth parts 32 are arranged in a circumferential shape to thereby form an inner diameter part 34 of the stator. Roundness of the inner diameter part 34 of the stator is set to 0.03 mm or less for securing a highly accurate shape over the entire lamination direction of the electromagnetic steel sheets 31. Note that roundness of the inner diameter part of the stator with approximately $\phi$40 mm to $\phi$100 mm is normally set to approximately 0.1 mm in many cases as described in Patent Literature 1.

The reason that roundness of the inner diameter 34 of the stator is set to approximately 0.1 mm is as follows. For example, when the dimension accuracy of the inner diameter part 34 of the stator is not good and roundness thereof is larger than 0.1 mm, variation occurs in an air gap 36 (a distance between a side surface part of a rotor 35 arranged inside the stator 33 and the tip end part of the teeth part 32). Accordingly, pulsation of torque such as cogging torque is increased and operation of the motor becomes unstable.

The cogging torque is the torque generated in positive/negative direction with rotation of the rotor in a non-conductive state, which causes noise or vibration when the motor is operated. Therefore, it is required to reduce the cogging torque to a smaller value in a precision motor for the purpose of improving controllability and efficiency of the motor.

However, in a case where the stator 33 shown in FIG. 6 is formed by using thin strips made of the amorphous magnetic material or the magnetic material with nanocrystal grains (hereinafter referred to as magnetic thin strips) instead of using the electromagnetic steel sheets 31, the inner diameter part of the stator has an elliptical shape due to a reason on physical properties peculiar to the magnetic thin strips. As a result, the following problems occur.

The problems will be explained with reference to FIG. 7A and FIG. 7B. FIG. 7A is a top view of a stator 33a formed by laminating the magnetic thin strips 1. FIG. 7B is a schematic view showing the air gaps 36 formed by an inner diameter part 34a of the stator 33a and the rotor 35.

As shown in FIG. 7A and FIG. 7B, the inner diameter part 34 of the stator has the elliptical shape when the magnetic thin strips 1 are laminated. Accordingly, the variation of the air gaps 36 formed by the inner diameter part 34a of the stator 33a and the rotor 35 is increased as shown in FIG. 7B. As a result, the cogging torque is increased.

SUMMARY

An object of one aspect of the present disclosure is to provide a stator and a motor capable of reducing cogging torque.

In a stator in which a plurality of magnetic thin strips each having a plurality of teeth parts are laminated according to one aspect of the present disclosure, the magnetic thin strip includes an elliptical-shaped inner diameter part formed along tip end portions of the plural teeth parts, at least one magnetic thin strip in the laminated magnetic thin strips is shifted by a given angle with respect to other magnetic thin strips in a horizontal direction, and positions of all teeth parts of the laminated magnetic thin strips correspond to one another.

A motor according to one aspect of the present disclosure includes the stator according to one aspect of the present disclosure and a rotor.

According to the present disclosure, cogging torque can be reduced.

BRIEF DESCRIPTION OF THE DRAWINGS

FIG. 3 is an enlarged view of a cross section taken along a dotted line shown in FIGS. 2 and 4;

FIG. 4 is a top view schematically showing examples of inner diameter parts of respective plural small laminates and air gaps according to the embodiment of the present disclosure;

DESCRIPTION OF EMBODIMENT

Hereinafter, an embodiment of the present disclosure will be explained with reference to the drawings. The same symbols are given to common components in respective drawings and explanation thereof will be suitably omitted.

Figure 1:
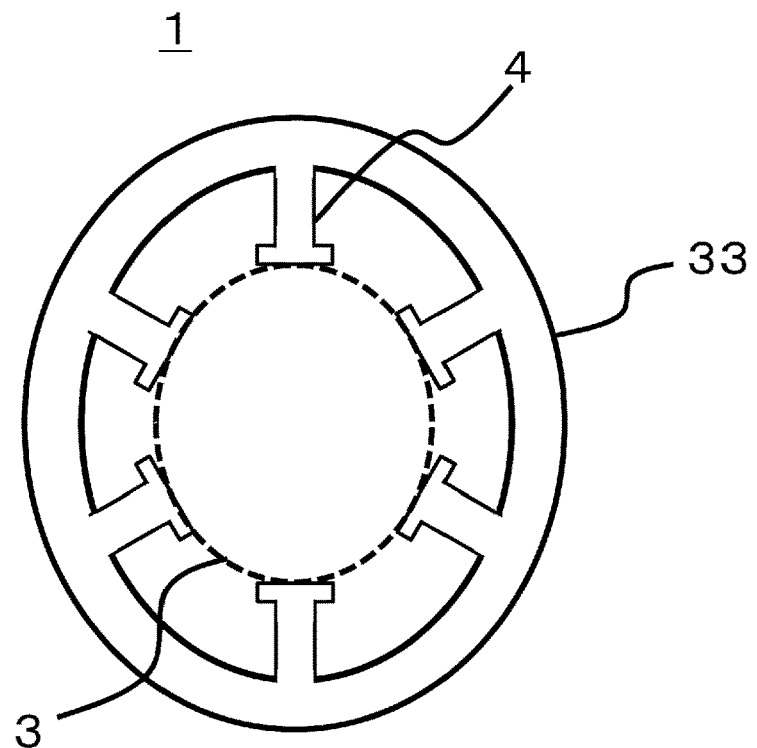
FIG. 1 is a top view of a magnetic thin strip according to an embodiment of the present disclosure.

First, a magnetic thin strip 1 according to the embodiment will be explained with reference to FIG. 1. FIG. 1 is a top view of the magnetic thin strip 1 according to the embodiment.

The magnetic thin strip 1 shown in FIG. 1 is, for example, a thin strip made of an amorphous magnetic material (also referred to as an amorphous thin strip). The magnetic thin strip 1 is manufactured by, for example, a liquid rapid cooling solidification method in which a metal in a molten state is rapidly cooled at approximately 1,000,000° C./second.

Figure 2:
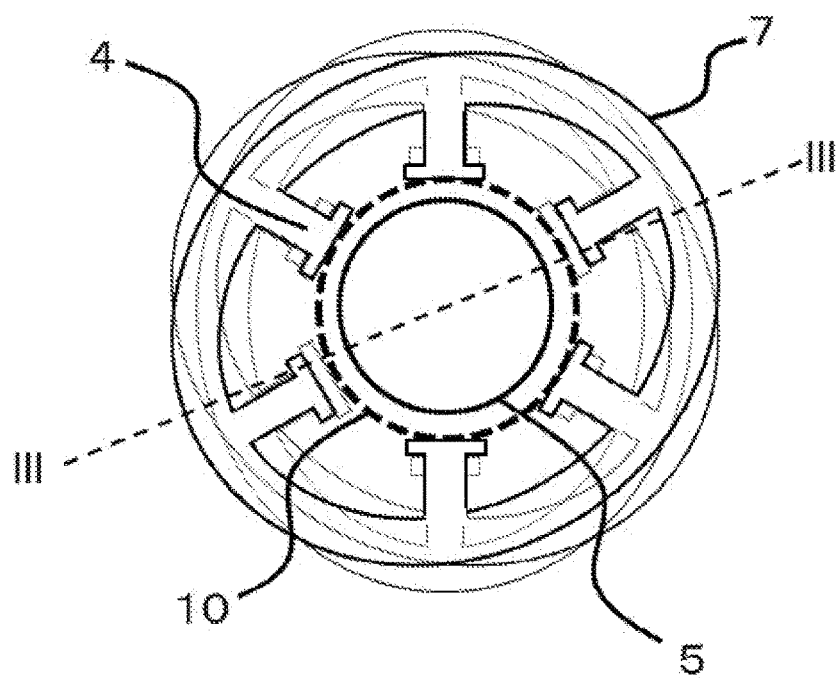
FIG. 2 is a top view of a motor according to the embodiment of the present disclosure.

When a thickness of a piece of magnetic thin strip 1 is reduced to approximately 0.01 mm or less, holes are made in the magnetic thin strip 1 due to the liquid rapid solidification method, which reduces the efficiency of a motor 100 (see FIG. 2). On the other hand, when the thickness of a piece of magnetic thin strip 1 is increased to approximately 0.06 mm or more, magnetic properties are reduced; therefore, efficiency of the motor 100 is reduced. Accordingly, it is preferable that the thickness of one magnetic thin strip 1 is approximately 0.01 mm to 0.06 mm.

The magnetic thin strip in which a thin strip in an amorphous state is fabricated by the liquid rapid cooling solidification method and nanocrystals are formed by thermal processing after that can be used.

As shown in FIG. 1, the magnetic thin strip 1 has protruding teeth parts 4 thereinside. A case in which the number of teeth parts 4 is five is cited as an example in FIG. 1; however, the number is not limited to this.

Also as shown in FIG. 1, an inner diameter part 3 of the magnetic thin strip 1 is formed along tip end parts of respective teeth parts 4, which has an elliptical shape.

The magnetic thin strip 1 explained above is used for a stator 7 of the later-described motor 100.

Next, the motor 100 according to the embodiment will be explained with reference to FIG. 2 to FIG. 4. FIG. 2 is a top view of the motor 100 according to the embodiment. FIG. 3 is an enlarged view of a cross section taken along a dotted line III-III shown in FIG. 2. FIG. 4 is a top view schematically showing examples of inner diameter parts of respective plural small laminates 15 and air gaps.

The motor 100 includes the stator 7 and a rotor 5 rotated by the stator 7.

As shown in FIG. 2, the rotor 5 is provided inside respective teeth parts 4 in the stator 7.

The stator 7 includes a laminate 2 (see FIG. 3) formed by laminating plural magnetic thin strips 1 shown in FIG. 1.

Also as shown in FIG. 2, the inner diameter part 10 of the stator 7 is formed along tip end parts of respective teeth parts 4. Coils wound around the teeth parts 4 are not shown in FIG. 2.

As shown in FIG. 3, the laminate 2 includes small laminates 15a to 15f.

The small laminates 15a to 15f are respectively formed by laminating plural magnetic thin strips 1 so as not to be shifted in a circumferential direction. Each of the small laminates 15a to 15f has a thickness of approximately 0.06 mm to 5 mm.

Note that the "circumferential direction" in the embodiment indicates a clockwise direction or a counterclockwise direction in respective top views. The circumferential direction is an example of a horizontal direction.

The above small laminates 15a to 15f are laminated so that positions of all teeth parts 4 correspond to one another and so as to turn by a given angle in the circumferential direction (in other words, so as to turn by a given angle in the horizontal direction). The given angle is, for example, 120 degrees. Accordingly, the small laminates 15c and 15d (inner diameter parts 16c and 16d) are shifted by 120 degrees with respect to the small laminates 15a and 15b (inner diameter parts 16a and 16b) in the circumferential direction, and the small laminates 15e and 15f (inner diameter parts 16e and 16f) are shifted by 120 degrees with respect to the small laminates 15c and 15d (inner diameter parts 16c and 16d) in the circumferential direction (see FIG. 4).

The inner diameter parts 16a to 16f shown in FIG. 3 and FIG. 4 are respectively inner diameter parts of the small laminates 15a to 15f laminated as described above. The inner diameter parts 16a to 16f are within a range of approximately ϕ59.5 mm to 00.5 mm with respect to an inner diameter part of ϕ60 mm on design.

The small laminates 15a to 15f are laminated so as to be shifted in the circumferential direction as described above, thereby averaging air gaps 14 in the lamination direction of the small laminates 15a to 15f (may be referred to as a thickness direction of the stator 7) and in the entire circumferential direction of the stator 7 as shown in FIG. 4. The air gap 14 is a distance between the inner diameter part 10 of the stator 7 and the rotor 5.

As described above, variation of the air gaps 14 in the circumferential direction and the lamination direction can be averaged in the stator 7 according to the embodiment; therefore, the air gaps 14 can be reduced as a whole. The cogging torque generated in a range of 1.5% to 2.0% of rated torque in a related-art motor can be reduced to 0.2% to 0.7% of rated torque in the motor 100 having the stator 7 according to the embodiment.

The smaller each thickness of the small laminates 15a to 15f becomes, the more uniform the variation of the air gaps 14 with respect to the lamination direction of the small laminates 15a to 15f can be, which makes the cogging torque further smaller. However, when each thickness of the small laminates 15a to 15f is reduced to approximately 0.06 mm or less, rigidity of the small laminates 15a to 15f is reduced. As a result, tip end parts of the teeth parts 4 may be deformed or the efficiency of the motor 100 may be reduced. On the other hand, when each thickness of the small laminates 15a to 15f is increased to approximately 5 mm or more, it is difficult to ignore local biasing in the air gaps 14 with respect to the lamination direction of the small laminates 15a to 15f, which deteriorates the cogging torque. According to the above, it is preferable that each thickness of the small laminates 15a to 15f is approximately 0.06 mm to 5 mm.

Moreover, an angle at which the small laminates 15a to 15f are turned in the circumferential direction (hereinafter referred to as a turning angle) is preferably an integral multiple of an angle made by adjacent teeth parts 4 (for example, 60 degrees shown in FIG. 4). For example, when the number of the teeth parts 4 are six as shown in FIG. 2, the turning angle is set to 120 degrees. Even when the number of teeth parts is other than six, variation of the air gaps 14 can be reduced by setting the turning angle to the integral multiple of the angle made by adjacent teeth parts 4, thereby reducing the cogging torque.

Figure 5A:
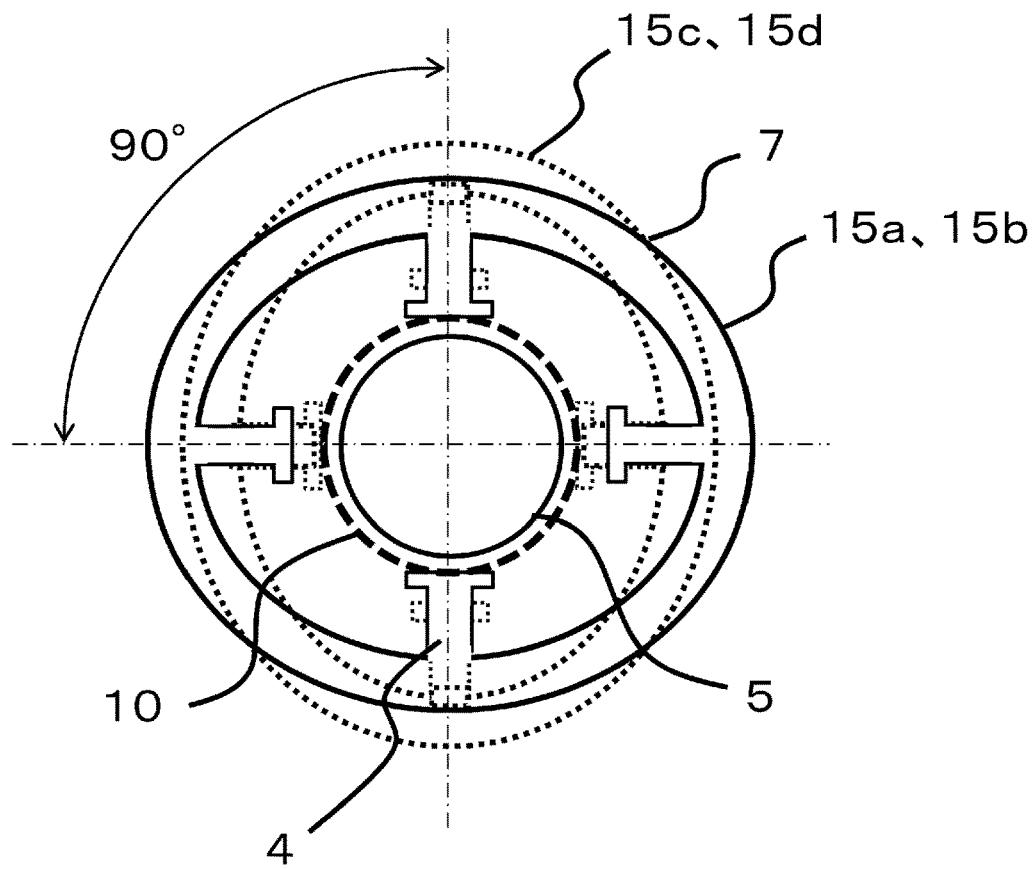
FIG. 5A is a top view of a stator and a rotor according to the embodiment of the present disclosure.
Figure 5B:
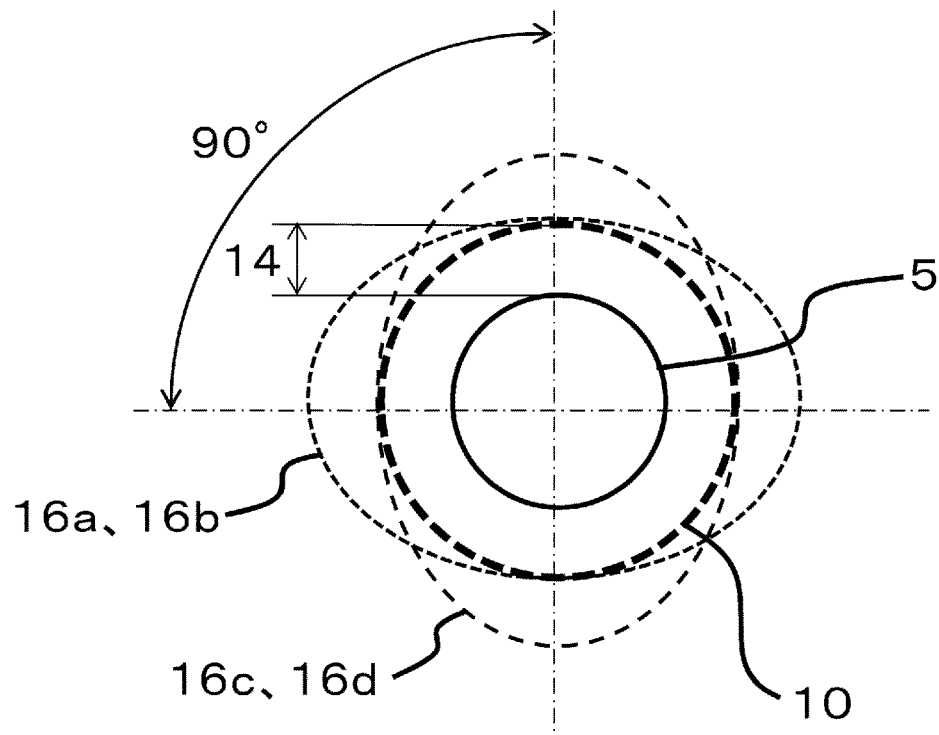
FIG. 5B is a top view schematically showing examples of respective inner diameter parts of respective small laminates and the air gaps according to the embodiment of the present disclosure.
Figure 6:
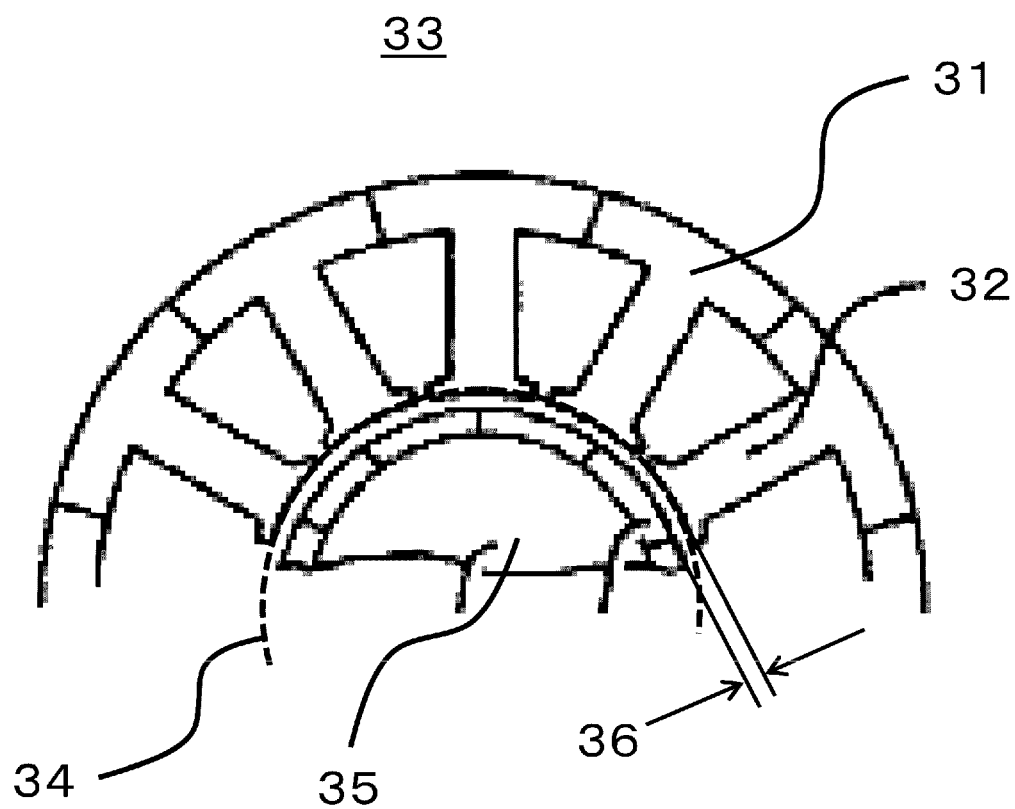
FIG. 6 is a top view of a rotor according to Patent Literature 1.
Figure 7A:
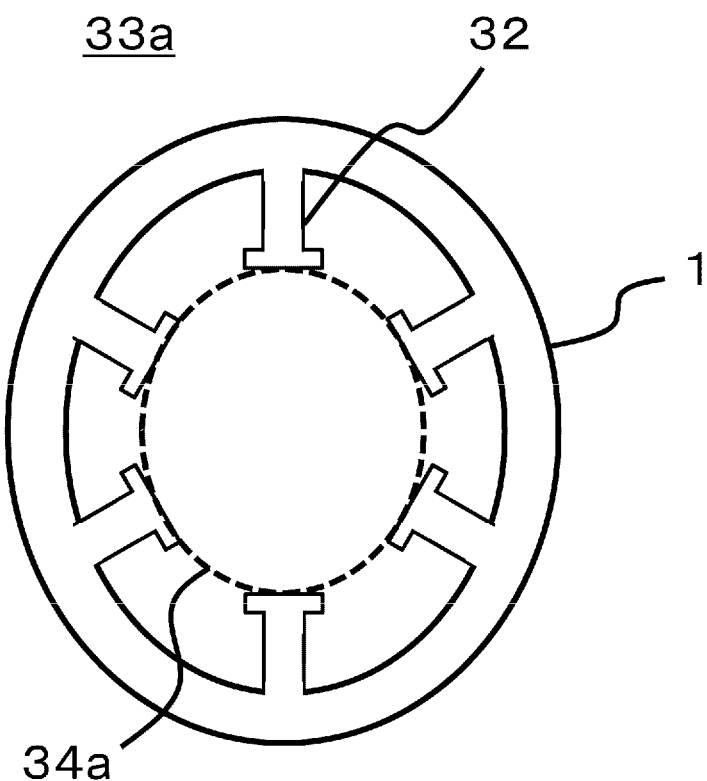
FIG. 7A is a top view of a stator using thin strips made of an amorphous magnetic material or a magnetic material with nanocrystal grains.
Figure 7B:
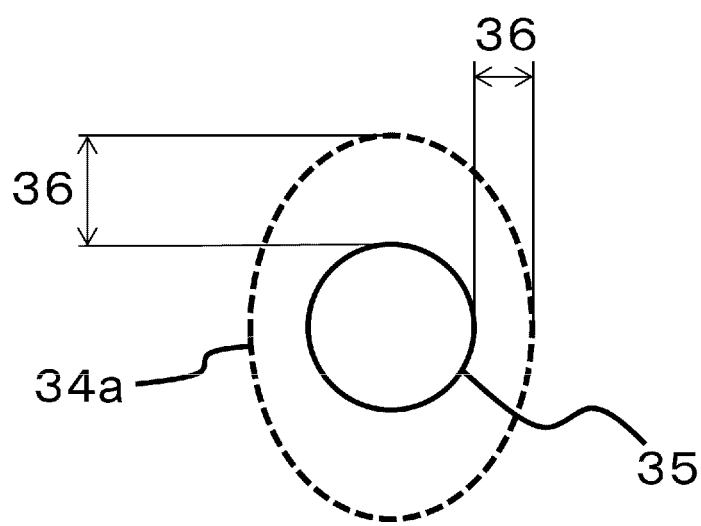
FIG. 7B is a schematic view showing air gaps in the stator shown in FIG. 7A.

Here, for example, a case where the number of teeth parts 4 in the stator 7 is four will be explained with reference to FIG. 5A and FIG. 5B. FIG. 5A is a top view showing the stator 7 and the rotor 5. FIG. 5B is a top view schematically showing examples of inner diameter parts 16a to 16d of the respective small laminates 15a to 15d and the air gaps 14.

As shown in FIG. 5A, the stator 7 has four teeth parts 4. An angle made by adjacent teeth parts 4 is 90 degrees. The stator 7 also has laminated small laminates 15a to 15d.

As shown in FIG. 5A, the small laminates 15a, 15b are turned by 90 degrees with respect to the small laminates 15c and 15d in the circumferential direction. Accordingly, the small laminates 15a and 15b are shifted by 90 degrees with respect to the small laminates 15c and 15d in the circumferential direction. That is, the angle made by adjacent teeth parts 4 corresponds to the turning angle in this case.

Also in this case, the air gaps 14 can be averaged in the lamination direction of the small laminates 15a to 15d (may be referred to as the thickness direction of the stator 7) and the entire circumferential direction of the stator 7 as shown in FIG. 5B.

Therefore, even when the number of teeth parts 4 of the stator 7 is four, variation of the air gaps 14 can be reduced (in other words, can be averaged), and the cogging torque can be reduced.

The reason that variation in the air gaps 14 can be reduced and the cogging torque can be reduced will be explained as follows.

The magnetic thin strip 1 shown in FIG. 1 is the amorphous thin strip, which is manufactured by using an Fe (iron) based magnetic material by the liquid rapid cooling solidification method. In the liquid rapid cooling solidification method, it is necessary to wind the amorphous thin strip at extremely high speed. Accordingly, the liquid rapid cooling solidification method adopts a process of continuously winding the magnetic material around a water-cooled copper roll while supplying liquid to the magnetic material in a state of a certain width and the amorphous thin strips are peeled off from the copper roll.

The magnetic material is in a state of being wound around the copper roll when the material is rapidly cooled and solidified (in other words, when the material is phase-transformed into an amorphous material). At this time, the magnetic material is kept in a curvature of the copper roll in a flow direction (a circumferential direction of the copper roll). Therefore, strains are accumulated in the magnetic material. On the other hand, the magnetic material is not affected by the curvature of the copper roll in a width direction thereof.

As a result, the magnetic material has a property that amounts of strains to be accumulated largely differ in the width direction and in the flow direction.

When the magnetic material is processed into the shape of the magnetic thin strip 1 shown in FIG. 1, huge strains in the magnetic material are released to some degree; therefore, deformation occurs in a shape obtained after processing. However, the amounts of strains differ in the width direction and in the flow direction of the magnetic material as described above. As a result, the magnetic thin strip 1 having the elliptical shaped-inner diameter 3 as shown in FIG. 1 is formed.

Accordingly, the inner diameter parts 16a to 16f (see FIG. 4) of the small laminates 15a to 15f formed by laminating the magnetic thin strips 1 also have the elliptical shape.

In the embodiment, such small laminates 15a to 15f are laminated so that positions of all teeth parts 4 correspond to one another and so that the small laminates 15a to 15f are turned by a given angle in the circumferential direction to laminate and fabricate the stator 7. In the stator 7, the air gaps 14 can be averaged in the circumferential direction of the stator 7 (may be the laminate 2) and in the thickness direction of the stator 7 (may be the laminate 2) as shown in FIG. 4.

When the air gaps 14 are averaged as described above, it is possible to reduce variation in magnetic flux density entering from the rotor 5 to the stator 7 at the time of rotational movement of the motor 100. As a result, the cogging torque can be reduced.

The present disclosure is not limited to the above explanation of the embodiment, and various modifications may occur within a scope not departing from the gist thereof.

The case where the magnetic thin strip 1 is the amorphous thin strip has been explained as an example in the embodiment; however, the magnetic thin strip 1 may be a thin strip made of a magnetic material with nanocrystal grains (hereinafter referred to as a nanocrystal thin strip). The nanocrystal thin strip is a thin strip in a crystal state which can be generated only when a prescribed thermal treatment is performed to the amorphous thin strip. Accordingly, the nanocrystal thin strip has the shape with the elliptical inner diameter part in the same manner as the amorphous thin strip. Therefore, the inner diameter parts of the small laminates formed by using the nanocrystal thin strips have also the elliptical shape. Then, variation of air gaps can be averaged in the stator formed by laminating the small laminates so as to be turned in the circumferential direction, and the motor having the stator. As a result, the cogging torque can be reduced.

The stator and the motor according to the present disclosure can be applied to motors with various structures such as an inner-rotor type and an outer-rotor type. The stator according to the present disclosure can be also applied to applications of electronic components making use of magnetism such as a transformer and a power choke coil.

What is claimed is:

1. A stator including a plurality of magnetic thin strips, each of the plurality of magnetic thin strips having a plurality of teeth parts, the plurality of magnetic thin strips being laminated, wherein
    each of the plurality of magnetic thin strips includes an elliptical-shaped inner diameter part formed along tip end portions of the respective plurality of teeth parts,
    in a plan view, at least one magnetic thin strip is angularly separated by a given angle with respect to at least one other magnetic strip of the plurality of magnetic thin strips, the at least one magnetic strip and the at least one other magnetic strip being adjacent each other,
    the given angle is an angle made by adjacent ones of the plurality of teeth parts or an angle of an integral multiple of the angle made by the adjacent ones of the plurality of teeth parts,
    positions of all of the plurality of teeth parts of the plurality of laminated magnetic thin strips correspond to one another, and
    in the plan view, an inner diameter part of the at least one magnetic thin strip and an inner diameter part of the at least one other magnetic strip are radially offset with respect to each other by different distances.

2. The stator according to claim 1, wherein the magnetic thin strip is an amorphous thin strip or a nanocrystal thin strip.

3. The stator according to claim 1, wherein a thickness of one magnetic thin strip is 0.01 mm to 0.06 mm.

4. A motor comprising:
    the stator according to claim 1; and
    a rotor.

5. A stator including a plurality of magnetic thin strips, each of the plurality of magnetic thin strips having a plurality of teeth parts, the plurality of magnetic thin strips being laminated, wherein
    each of the plurality of magnetic thin strips includes an elliptical-shaped inner diameter part formed along tip end portions of the respective plurality of teeth parts,
    in a plan view, at least one magnetic thin strip is angularly separated by a given angle with respect to at least one other magnetic strip of the plurality of magnetic thin strips, the at least one magnetic strip and the at least one other magnetic strip being adjacent each other, the plurality of laminated magnetic thin strips include a plurality of small laminates in which the magnetic thin strips are laminated so as not to be shifted by a given angle in the circumferential direction, at least one small laminate in the plurality of small laminates is shifted by a given angle with respect to other of the plurality of small laminates in the circumferential direction, positions of all of the plurality of teeth parts of the plurality of laminated magnetic thin strips correspond to one another, and in the plan view, an inner diameter part of the at least one magnetic thin strip and an inner diameter part of the at least one other magnetic strip are radially offset with respect to each other by different distances.

6. The stator according to claim 5, wherein a thickness of one small laminate is 0.06 mm or more.

7. The stator according to claim 5, wherein the given angle is an angle made by adjacent ones of the plurality of teeth parts or an angle of an integral multiple of the angle made by the adjacent ones of the plurality of teeth parts.

8. The stator according to claim 5, wherein the magnetic thin strip is an amorphous thin strip or a nanocrystal thin strip.

9. The stator according to claim 5, wherein a thickness of one magnetic thin strip is 0.01 mm to 0.06 mm.

10. A motor comprising:
the stator according to claim 5; and
a rotor.

* * * * *